Patented Sept. 21, 1926.

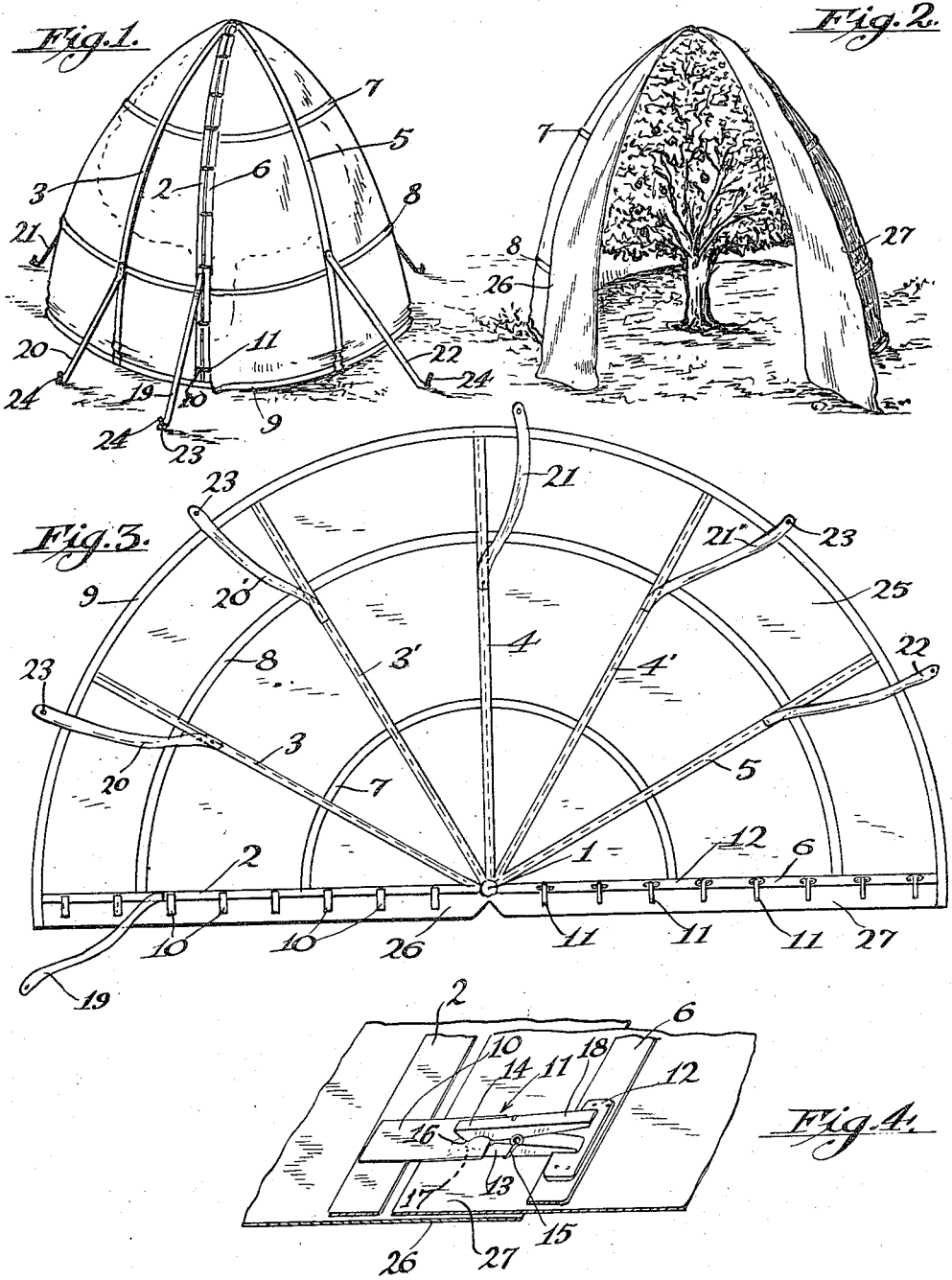

1,600,749

UNITED STATES PATENT OFFICE.

CHARLES J. BARNES, OF REDLANDS, CALIFORNIA.

FROST-PREVENTIVE COVERING FOR TREES.

Application filed April 1, 1925. Serial No. 19,945.

The principal object of this invention is to make a frost preventive covering for trees, so as to avoid the necessity of using smudge pots or the like.

Another object is to make a frost preventive covering for trees which may be readily placed in position when the cold weather is approaching and which is transparent or translucent to allow the passage of sunshine to the trees so that the covering may be left in position for several days at a time without in any way injuring the trees.

Another object is to make a frost preventive covering for trees which is very light and easily applied and which will make a comparatively small package when removed and folded for storage.

Other objects and advantages will appear from the drawings and specifications.

The invention consists of the novel features herein shown, described and claimed.

Figure 1 is a perspective showing a frost preventive covering for trees embodying the principles of my invention as in use.

Fig. 2 is a view analogous to Fig. 1, the covering being open to show the tree.

Fig. 3 is a plan of the covering as when the covering is spread flat upon the ground or floor.

Fig. 4 is a fragmentary perspective upon an enlarged scale and showing the details of a gripping fastener and the overlapping flaps for connecting the sides of the covering together, making an air-tight and rain proof construction.

The details of construction and operation are as follows:

A frame work of suitable tape is first constructed and consists of a suitable attaching member 1 at the center, a plurality of members 2, 3, 3', 4, 4', 5 and 6 radiating from the member 1 and substantially equally spaced apart and forming vertical cords, and a plurality of web members 7, 8, and 9 connecting the members 2, 3, 3', 4, 4', 5 and 6 and forming horizontal cords. A series of short straps 10 are attached to the member 2, the corresponding ends to form free tabs to be engaged by the corresponding fasteners. A corresponding series of gripping fasteners 11 are attached to the member 6 in positions to engage the tabs 10. Each fastener 11 comprises an attaching base 12, a gripping jaw 13 extending rigidly from the base, a jaw 14 pivotally connected to the jaw 13 by a pivot spring 15, tending to force the points 16 and 17 together to grip the tab 10 and so that by pressing the end 18 towards the base 13 the grip is released. This construction is similar to an ordinary clothes pin, except that means are provided for attaching one bar to the member 6. Stake straps 19, 20, 21, 21' and 22 are attached to the members 2, 3, 3', 4, 4', 5 and not to the member 6 and extend loosely, outwardly and downwardly and have eyes 23 in their free ends to receive stakes or pins 24 to be inserted in the ground to hold the cover in place as in Fig. 1.

The object of the tapes or webs is to form a light, strong, flexible frame work and a cover 25 is applied to the frame work and extends from the member 2 all the way around to the member 6 and extends to form overlapping flaps 26 and 27, the flap 26 extending beyond the member 2 and the flap 27 extending beyond the member 6, so that when the covering is placed in position upon a tree the flap 27 will be outside of the flap 26 when the grips 11 are applied to the tabs 10.

The covering 25 may be made of paraffin paper or any suitable translucent or transparent and water-proof material which will permit the passage of sunlight to the tree when the covering is upon the tree, and the covering may be applied to the tapes or webs in various ways preferably by a suitable cement. The material may be paraffined or otherwise treated before it is applied to the frame, or it may be so treated after being applied to the frame.

The covering thus constructed is intended to entirely enclose a tree as shown in Fig. 1 and in applying the covering the stake strap 19 may be attached to the ground by a stake 24 and then the covering unfolded around the tree with the center 1 at the top of the tree and the other stake straps attached to the ground and finally the grips applied to the tabs 10, thus completely enclosing the tree, the purpose being to hold the heat from radiating from the ground and the tree enclosed by the covering and to keep frost and cold out of the covering and away from the tree.

Heretofore it has been customary to use smudge pots fired with oil and to make smoke screens to surround the trees of an orchard and keep the frost away In this climate there may be two or three freezing spells in a season and it requires many smudge pots and a lot of oil to ward off a freezing spell. Furthermore, there are many objections to smudge pots on account of the smoke, soot, and so on.

It is my plan to apply the frost preventive covering to the trees when warning comes of an approaching cold spell and to leave the coverings upon the trees until the cold spell has completely passed, then remove the coverings and fold them in the packages and store them away until their use is again required.

The frame may be constructed in various ways, the plan shown in Fig. 3 being diagrammatic and suggestive. If a paper is applied to the frame it must necessarily be water-proof because it usually rains more or less during a cold spell at which time the coverings would be in use and rain would destroy a covering that was not water-proof.

It is considered important that the covering be non-light absorbing so that when the covering is left in place a considerable length of time sunlight will readily penetrate the cover and allow the tree to grow and the fruit to ripen as though the covering were not in place.

Various changes may be made without departing from the spirit of my invention as claimed.

I claim:

1. A frost preventing covering for trees comprising in combination a central attaching member, diametrically opposite tapes extending therefrom, a series of radial tapes extending from the central attaching member, the diametrically opposite tapes and the radial tapes being adapted to form vertical cords spaced apart, a plurality of curved webbings extending between the radial tapes and the diametrically opposite tapes, adapted to form horizontal cords, a cover material secured to the tapes and the webbings, the diametrically opposite tapes having short straps and fastening members secured thereto, adapted to be connected together to form a junction when the cover is placed over a tree or the like.

2. A frost preventing covering for trees comprising in combination a central attaching member, diametrically opposite tapes having short straps and fastening members secured thereto, a series of radial tapes extending from the central attaching member, having stake straps secured thereto, a series of semi-circular webs connecting the diametrically opposite tapes and the radial tapes, a covering material attached to the diametrically opposite tapes the radial tapes and the webs, the said short straps and fastening members being adapted to form a junction, the diametrically opposite tapes and radial tapes forming substantially vertical cords and the semi-circular webs forming horizontal cords when the cover is placed over a tree.

In testimony whereof I have signed my name to this specification.

CHARLES J. BARNES.